United States Patent [19]

Oreper

[11] Patent Number: 5,505,072
[45] Date of Patent: Apr. 9, 1996

[54] SCANNING CIRCUIT FOR PRESSURE RESPONSIVE ARRAY

[75] Inventor: Boris Oreper, Newton, Mass.

[73] Assignee: Tekscan, Inc., South Boston, Mass.

[21] Appl. No.: 339,825

[22] Filed: Nov. 15, 1994

[51] Int. Cl.$^6$ .......................... G01L 27/00; G01L 15/00; G01L 9/02
[52] U.S. Cl. .................. 73/4 R; 73/1 B; 73/719; 73/862.045; 73/862.046; 364/571.05
[58] Field of Search .................... 73/4 R, 1 B, 862.042, 73/862.043, 862.044, 862.045, 862.046, 172, 719, 720, 721; 364/558, 571.01–571.08, 574

[56] References Cited

U.S. PATENT DOCUMENTS

| | | | |
|---|---|---|---|
| 3,906,207 | 9/1975 | Rivere et al. | 73/117.3 X |
| 3,944,740 | 3/1976 | Murase et al. | 178/18 |
| 4,111,058 | 9/1978 | Gross | 73/721 X |
| 4,190,797 | 2/1980 | Lecklider et al. | 73/172 X |
| 4,213,348 | 7/1980 | Reinertson et al. | 73/726 X |
| 4,483,178 | 11/1984 | Miile | 73/4 R X |
| 4,695,963 | 9/1987 | Sagisawa et al. | 73/862.044 X |
| 4,781,056 | 11/1988 | Noel et al. | 73/1 B |
| 4,856,993 | 8/1989 | Maness et al. | 73/865.7 X |
| 5,361,133 | 11/1994 | Brown et al. | 356/376 |
| 5,374,282 | 12/1994 | Nichols et al. | 607/18 |

OTHER PUBLICATIONS

*Patent Abstracts of Japan* Grp P178, vol. 7, No. 48 Abs Pub. date Feb. 24, 1983 (57–196385) "Scanning System for Electronic Blackboard System".

*Patent Abstracts of Japan* Grp P671, vol. 12, No. 66 Abs Pub. date Feb. 27, 1988 (62–206423) "Tactile Sense Detection by Distribution Type Tactile Sensor and Circuit Therefor".

*Primary Examiner*—Thomas P. Noland
*Attorney, Agent, or Firm*—Wolf, Greenfield & Sacks

[57] ABSTRACT

A scanning circuit for an array of pressure responsive sensor points which permits the sensitivity of the circuit to be controlled. In particular, the sensitivity of the circuit may be controlled by controlling a test and/or reference voltage used with the circuit and different sensitivity or resolutions may be provided for different areas of the array. The circuit also provides enhanced interelectrode isolation, permitting a single test voltage to be utilized to scan all sensor points on a given input electrode and further reduces the time required to scan the array by reducing trace capacitance discharge time and by inhibiting processing for sensor points which are not of interest. The accuracy of pressures being sensed is also enhanced by adjusting the test voltage to compensate for load variations.

17 Claims, 4 Drawing Sheets

SCANNING CIRCUIT FOR PRESSURE RESPONSIVE ARRAY

FIELD OF THE INVENTION

This invention relates to pressure sensors formed from an array of pressure responsive sensor points and more particularly to an improved circuit for more quickly and accurately scanning such an array with controlled sensitivity.

BACKGROUND OF THE INVENTION

U.S. Pat. No. 4,856,993 (hereinafter the '993 patent), which is assigned to the assignee of the current application, describes a variable resistance pressure sensing array and a circuit for scanning such array. Such arrays may, for example, be used as a contact sensor for dental occlusion, to detect foot pressure in a shoe, to detect pressure distribution on a gasket, and in numerous other applications where information on pressure or force distribution over a defined area is required. While the device of this patent represented a substantial step forward in the art at the time the application was filed, and the technology disclosed in this patent is still being utilized for many applications, improvements are possible in the performance of this circuit in areas such as response time, precision of the outputs, and sensitivity control. It is also desirable to reduce potential cross-talk between electrodes. Among other things, this would eliminate the need for the variable resistance layers 74 shown in FIG. 2b of the '993 patent, the elimination of this extra layer of pressure responsive ink or other pressure sensitive material resulting in a significant reduction in the fabrication cost of the array and also resulting in enhanced resolution.

More particularly, each sensor point where the electrodes intersect in a sensing array of the type shown in the '993 patent also has a trace capacitance which is charged during sampling of the point. If such capacitance must discharge through the interelectrode pressure sensitive resistance between successive applications of a test voltage or other signal to the electrodes, the time for the capacitances to fully discharge or for the circuit to settle between each application of test voltage can be up to one millisecond. For large arrays with perhaps hundreds of electrodes in each direction, this can result in substantial lost time in completing a single scan of the entire array, and can make the time for completing such a scan unacceptably long. It would be preferable if this time could be reduced by at least an order of magnitude, and preferably to something in the ten to twenty microsecond range.

Further, trace resistances in the array, such as those for the electrodes and the multiplexers, cause IR drops for test voltages applied to the array. Since the current being drawn varies with the load on the array, the voltage drop across the various trace resistances of the device also varies with load. This means that the test voltage applied to the sensing points varies with the pressure applied to the sensor point and with the number of sensor points having pressure applied thereto, resulting in errors which may be in the ten to twenty-five percent range in sensed pressures. A need therefore exists for an improved circuit which more accurately compensates the test voltage applied to the array for variations in load so as to enhance the accuracy of readings.

Another problem is in selecting pressure resolution for the array. Currently, different arrays having different inks or other variable resistance material are required in order to achieve different resolutions. For applications where the resolution or pressure range are substantially different for different areas of the array, either an array which is not optimum for any area must be utilized, or an expensive customized array must be fabricated. However, the customized array must be carefully aligned to achieve the desired results, and may, if somewhat misaligned, cause more harm than good. It would therefore be preferable if resolution variations could be achieved electronically, permitting either a single array to be constructed which could be used for all applications, or at least a very limited number of different arrays to cover the entire resolution range. Such array could also be calibrated for different ranges/resolutions in different areas.

Finally, in many applications there are outputs which are not of a sufficient level to be relevant for a particular application, or outputs may be redundant. Since the conversion of analog outputs to digital for processing and the processing of such outputs take substantial time, the speed of operation for the device can also be enhanced if such operations are only performed for points of concern and not for points which are either not of concern (for example being below a predetermined pressure level) or redundant. In particular, in many applications, pressure is only being applied to a few sensor points on the array and substantial processing time can be saved if processing is performed only for such points, rather than for all points on the array.

SUMMARY OF THE INVENTION

In accordance with the above, this invention provides a circuit for scanning an array of pressure responsive sensor points, each of which points is intersected by one of a first plurality of electrodes and one of a second plurality of electrodes. There is a pressure sensitive resistance between the electrodes intersecting at each of the sensor points. The circuit generates a test signal and has a first multiplexer for selectively applying the test signal to each first electrode, the test signal flowing through the pressure sensitive resistance for sensor points intersected by the first electrode for which the resistance is in a lowered resistance state to the second electrode intersecting the point, the resistance at the point being reduced as the pressure at the point increases. The current flowing through the point thus increasing with pressure. A second multiplexer is provided for selectively passing test signals appearing on the second electrodes to an output circuit. For preferred embodiments of the invention, the output circuit includes a device for controlling the sensitivity of the circuit, which device is preferably a ratiometric device. A reference signal, the value of which is controlled at least in part in response to a desired sensitivity, is applied as a second input to the ratiometric device. For preferred embodiments, the test signal is an analog voltage, the ratiometric device is a ratiometric A/D converter, one input to which are the outputs from the second multiplexer and the other input to which is a reference voltage. A desired sensitivity is selected for the circuit, with the value of the reference voltage being controlled at least in part in response to the selected sensitivity. For preferred embodiments, the reference voltage is reduced to achieve increased sensitivity.

A desired range of pressures to be sensed may also be indicated with the generated test voltage being of a value which is a function of the indicated range. More particularly, the value of the test voltage may be decreased to increase the pressure range at the high end and may be decreased to improve sensitivity for low pressures.

The load to which the test signal is applied may also be sensed, with the value of the test signal being controlled in response to the sensed load. Where the test signal is a test voltage, the current for the test voltage may be sensed and the value of the test voltage modified in response to the sensed current. For preferred embodiments, the test voltage is applied through a known resistance and a differential circuit is provided for detecting the voltage drop across the resistance. The output from the differential circuit is a function of the sensed current. For one embodiment of the invention, the modifying of the test voltage is performed by a circuit which includes an A/D converter for converting the sensed current to a digital value, a digital processor for generating a test voltage modifying value in response to the sensed current, a D/A converter for generating a test voltage modifying voltage, which voltage is applied to modify the test voltage. For another embodiment of the invention, modifying of the test voltage is accomplished by converting the sensed current into a test voltage modifying voltage and applying the modifying voltage to the test voltage generator. For example, the test voltage and the modifying voltage may be combined by adding or subtracting the modifying voltage.

To enhance the suppression of spurious signals and to improve isolation between electrodes, a virtual ground potential may be applied to each of the second electrode at the end of such electrode adjacent the second multiplexer. More particularly, the virtual ground potential may be applied by use of an operational amplifier with the positive input at ground, the negative input receiving the output from the second electrode, and a feedback through a feedback resistance from the operational amplifier output to its negative input.

There may also be trace capacitances for each sensor point with the circuit including a mechanism for reducing the discharge time for such trace capacitances at the end of each test signal. For preferred embodiments, the circuitry for reducing discharge time includes a resistance path to ground for each of the first electrodes.

A detector may also be provided at the output from the second multiplexer for determining if each output from the multiplexer exceeds a selected threshold value and for passing only outputs which exceed the threshold value to the output circuit. This eliminates the need to spend processing time and resources on sensor points which do not currently have useful information. The circuit may also detect and inhibit processing for redundant outputs.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1:
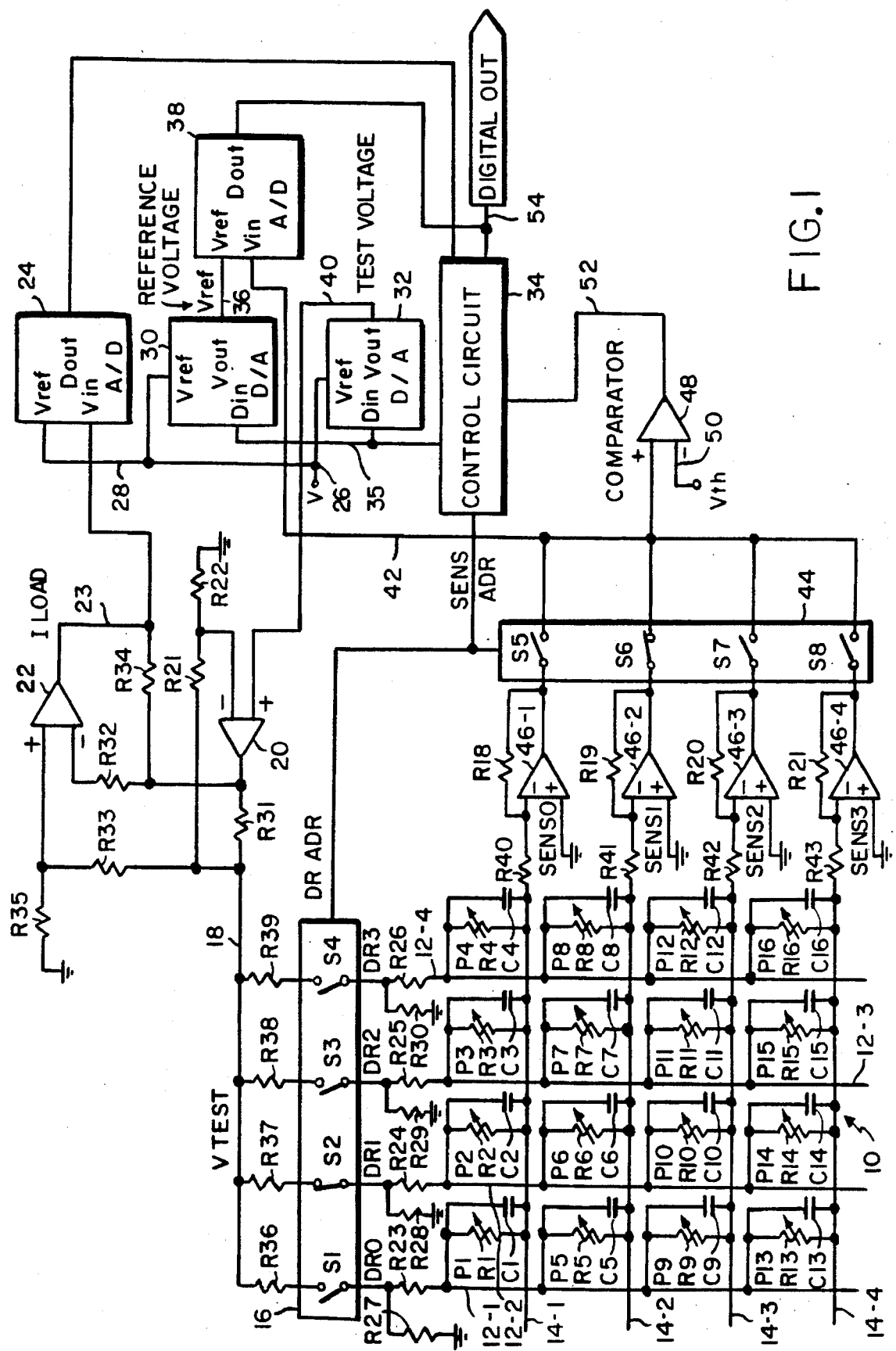
FIG. 1 is a schematic semiblock diagram of a circuit in accordance with a first embodiment of the invention.

Referring to FIG. 1, a matrix array 10 is formed from a plurality of first or input electrodes 12-1 to 12-4 and a plurality of second or output electrodes 14-1 to 14-4. These electrodes are each formed on a thin substrate of a plastic material such as Mylar or on another substrate material, with the substrates being separated by a layer of pressure sensitive ink or other pressure sensitive material. The intersection of each first electrode with each second electrode will sometimes be referred to hereinafter as a sensor point P1–P16, each of which sensor points has a resistance R1–R16 which varies with the pressure applied to the sensor point, being very high, in the order of megaohms, when no pressure is applied to the point, and being as little as 1,000 ohms when pressure is applied to the point. While not specifically designed into the circuit, there is also a trace capacitance C1–C16 at each of the sensor points, which capacitance may be in the order of 3 to 8 picofarads. The capacitance is formed by the electrodes as plates with the thin variable resistance layer therebetween serving as the dielectric.

A test signal or voltage Vtest on line 18 is applied to each of the first electrodes 12 through a first multiplexer or switch 16. Each of the electrodes 12-1 to 12-4 has an inherent trace resistance which is illustrated in FIG. 1 by lumped resistors R23, R24, R25 and R26, respectively, through which the test voltage passes. For reasons to be discussed later, a parallel path to ground is also provided for each input electrode 12 through resistors R27, R28, R29 and R30, respectively. The value of each of these resistors is relatively low, for example in the range of two to ten kohms.

The test voltage (Vtest) is applied to each switch S1-S4 of multiplexer 16, with each switch having a corresponding inherent resistance which is illustrated in the figure as a lumped resistor R36, R37, R38 and R39, respectively. These resistances are typically in the 50 to 100 ohm range. The signal on Vtest line 18 is obtained from operation amplifier 20 through a resistor R31. The voltage on the side of R31 adjacent amplifier 20 is connected through a resistor R32 to the negative input of an operation amplifier 22 and is also connected through a resistor R34 to the voltage input of an A/D converter 24. The voltage on the other side of resistor R31 is applied through R21 as a feedback to operational amplifier 20, with the signal passing through resistor R21 also being applied through resistor R22 to ground. In addition, the signal on the other side of resistor R31 is applied through resistor R33, both to the positive input of operational amplifier 22 and through resistor R35 to ground.

The output from operation amplifier 22, which is indicative of the load current passing through resistor R31 on Vtest line 18, is connected to the Vin input of A/D converter 24. The other input to converter 24 is a voltage reference input for the converter and is obtained from a fixed voltage source 26 over line 28. The signal on line 28 is also applied to the reference inputs on D/A converters 30 and 32. The digital inputs to converters 30 and 32 are obtained on lines 35 from a control circuit 34 which may, for example, be a standard microprocessor or other processor programmed to perform the various functions which will be discussed hereinafter, may be a special purpose piece of hardware for performing these functions, may be some type of hybrid circuit which performs some of the functions itself and serves as an interface with other processing circuitry which performs the other functions or may be other suitable control circuitry. Converter 30 develops a reference voltage on line 36 which is applied to the reference input of output A/D converter 38, while the input to D/A converter 32 is indicative of a test voltage. The test voltage output from D/A converter 32 is applied through line 40 to the positive input of operational amplifier 20. While the voltage on line 40 could be used directly as Vtest without passing through amplifier 20, it is preferable to include amplifier 20 and the related circuit to compensate for voltage drops across R31.

The Vin input for A/D converter 38 is output line 42 from output multiplexer 44. Output multiplexer 44 receives each of its inputs from an output of an operational amplifier 46-1 to 46-4. Each operational amplifier receives signals on a corresponding electrode 14-1 to 14-4 at its negative input. Resistors R40, R41, R42, R43 represent the trace resistances for the corresponding output electrodes. Because of the low current flowing through these electrodes, there is no need to compensate for their trace resistances. The output of each operational amplifier is also fed back through a corresponding resistor R18, R19, R20 and R21, respectively. The positive input to each operational amplifier 46 is connected to ground. The effect of the feedback signal for each of the operational amplifiers 46 is to maintain the output end of the corresponding electrode at substantially ground potential. However, the outputs of amplifiers 46 reflects the signal/current of the electrode 14.

Output line 42 from multiplexer 44 is also connected to the positive input of comparator 48. The negative input to comparator 48 is a threshold voltage on line 50. Thus, comparator 48 generates an output on line 52 to control circuit 34 only if the signal detected at array 10 exceeds some predetermined threshold. The digital output from converter 38 is connected to digital output line 54.

In operation, the circuit of FIG. 1 is intended to deal with a number of potential problems. First, when a number of resistors on a given electrode 12 have pressure applied thereto, current from test line 18 flows not only through the junction under test, for example resistor R6 of sensor point P6 in FIG. 1, but also through other resistances on the same input electrode 12. This increased load results in increased current on the test line, and thus increased IR drops in trace resistances of the electrodes 12, multiplexer and other circuit resistances which would normally reduce the value of Vtest which is applied to each sensor point. This can result in lower output signals than would otherwise be obtained, which lower output signals can be misinterpreted to mean that a lesser pressure is being applied to the sensor point or, when thresholding is being performed, even that no pressure is being applied to the point. A need exists to overcome this potential problem.

In the circuit of FIG. 1, this problem is overcome by R31 which is utilized in conjunction with differential amplifier 22 to detect the load current on the test line 18 and to generate an output on line 23 which is proportional to this load current. The signal on line 23 is converted to a digital value in A/D converter 24 with the digital value being applied to control circuit 34. Based on the detected current, an appropriate digital value for a Vtest, which is modified to compensate for the IR drops resulting from the detected current, is produced on lines 35, which value is converted in D/A converter 32 into an appropriate analog test voltage. As discussed earlier, this test voltage may be further modified by amplifier 20 to compensate for drops across R31 and the like. The circuit thus provides a consistent output signal for a given pressure at a given point P, regardless of what is happening at the other points on the same input electrode. While only four electrodes are shown in FIG. 1, in typical applications which may have dozens of electrodes, or possibly even hundreds of electrodes, the function performed by the above circuit becomes even more critical.

A second potential problem is that of isolation between electrodes so that the output received when a given point is being sampled is only the output from that point, and does not include spurious signals from other points to which pressure has been applied. Thus, for example, if P6 is the point being sampled, but points P3, P4, and P7 are all in a relatively low resistance state as a result of pressure applied thereto, the signal on line 12-2, in addition to being applied to line 14-2 through resistor R6, may also pass through resistor R2, line 14-1, resistor R3, line 12-3, and resistor R7 to line 14-2. Another spurious path might be through resistor R10, line 14-3, resistor R12, electrode 12-4, and resistor R8 to electrode 14-2. With larger sensing matrices, the potential for spurious paths could be quite large. Further, while discrete resistors are shown at each sensing point P, as a practical matter the variable resistance layer is continuous so that when this layer is in a low resistance state in a particular area due to pressure being applied in that area, spurious paths may even occur adjacent input and/or output electrodes, further increasing the potential for spurious signals.

In the circuit of FIG. 1, this problem is overcome by the operational amplifiers 46 in conjunction with their feedback resistors which cause the net potential at the output end of each of the output electrodes 14 to be tied to a virtual ground, regardless of the signal applied to such electrode. This results in all signals on each output electrode having a very low resistance path so that little if any spurious signals would pass through the resistance layer to the output electrode being sampled. However, the drop across the feedback resistor results in the desired output potential appearing at the multiplexer input for the given electrode.

This improved isolation between electrodes provides two fringe benefits. First, it permits a single, relatively thin layer of variable resistance material to be used. This reduces fabrication costs and enhances sensitivity. Second, it permits a single test voltage to be provided on an input line which test voltage is utilized to sample all of the output lines. Thus, if there were 44 output lines 14, a single test voltage on the input electrode could be applied to sample all 44 sample points for the input electrode, rather than having to apply 44 separate test voltages to the input electrode to sample the 44 points. Since there is a significant time required for the circuit to settle between the applications of test voltage thereto, this results in a significant reduction in the time required to sample array 10. Amplifiers 46 serve the additional function of isolating the array from switching transients from the output multiplexer 44. This is another factor which permits a single test signal rather than multiple test signals to be applied to the input electrodes for sampling all of the points on such electrode.

A Third problem is the discharging of the trace capacitances, for example capacitances C2, C6, C10 and C14 for input electrode 12-2. If, when the test signal is removed, these capacitors must discharge through the sensor point resistance and other circuit resistances, the discharge time could be substantial, on the order of one millisecond per input electrode 12. While for purposes of illustration only a four-by-four matrix is shown in FIG. 1, in most practical applications of a circuit of this type, much larger matrixes having hundreds or even thousands of sensor points could be utilized. With such arrays, a 70 to 75 microsecond delay between scans for each pixel where a test signal is required for each pixel, or a one microsecond delay between scans for each column where the test signal is applied only once for all pixels (sensor points) on an input electrode, to permit settling of the circuit is unacceptable. The circuit of FIG. 1 therefore provides a bypass resistor R27–R30 in parallel with each of the input electrodes through which the trace capacitance for a sensor point may rapidly discharge, thereby reducing the settling time for the circuit between scans of sensor points to as little as one microsecond. While the low resistance of the corresponding resistor R27–R30, for example in the order of 10K ohms, will result in at least some of the test current on a given input electrode 12 being shunted to ground, this is taken into account in the control circuitry in generating test signals and in interpreting outputs. The reduced discharge time of the trace capacitances, in conjunction with the single Vtest signal per input electrode, results in a substantial enhancement in the response time of the circuit.

The circuit is also capable of being calibrated for different pressure ranges and for different desired sensitivities. In particular, the various converters used in the circuit and the computations for the circuit may for example have 8 bit sensitivity or may have 16 bit sensitivity. While 16 bit sensitivity provides greater accuracy, it also increases both the cost of the circuit and the time required to perform scanning, 16 bit converters being slower than 8 bit converters. However, because of the range over which pressures are being received, even with 16 bit sensitivity, only 5 or 6 of the bits may actually be used. Therefore, by calibrating the circuit so as to operate optimally within the range of anticipated pressure inputs, the apparent sensitivity of the circuit may be enhanced so as to, for example, be able to achieve the benefits of 16 bit sensitivity while only using 8 bit components. Calibration also assures that the circuit will not overload at maximum anticipated pressures, permitting accurate outputs to be obtained over the full pressure range being measured.

Figure 4:
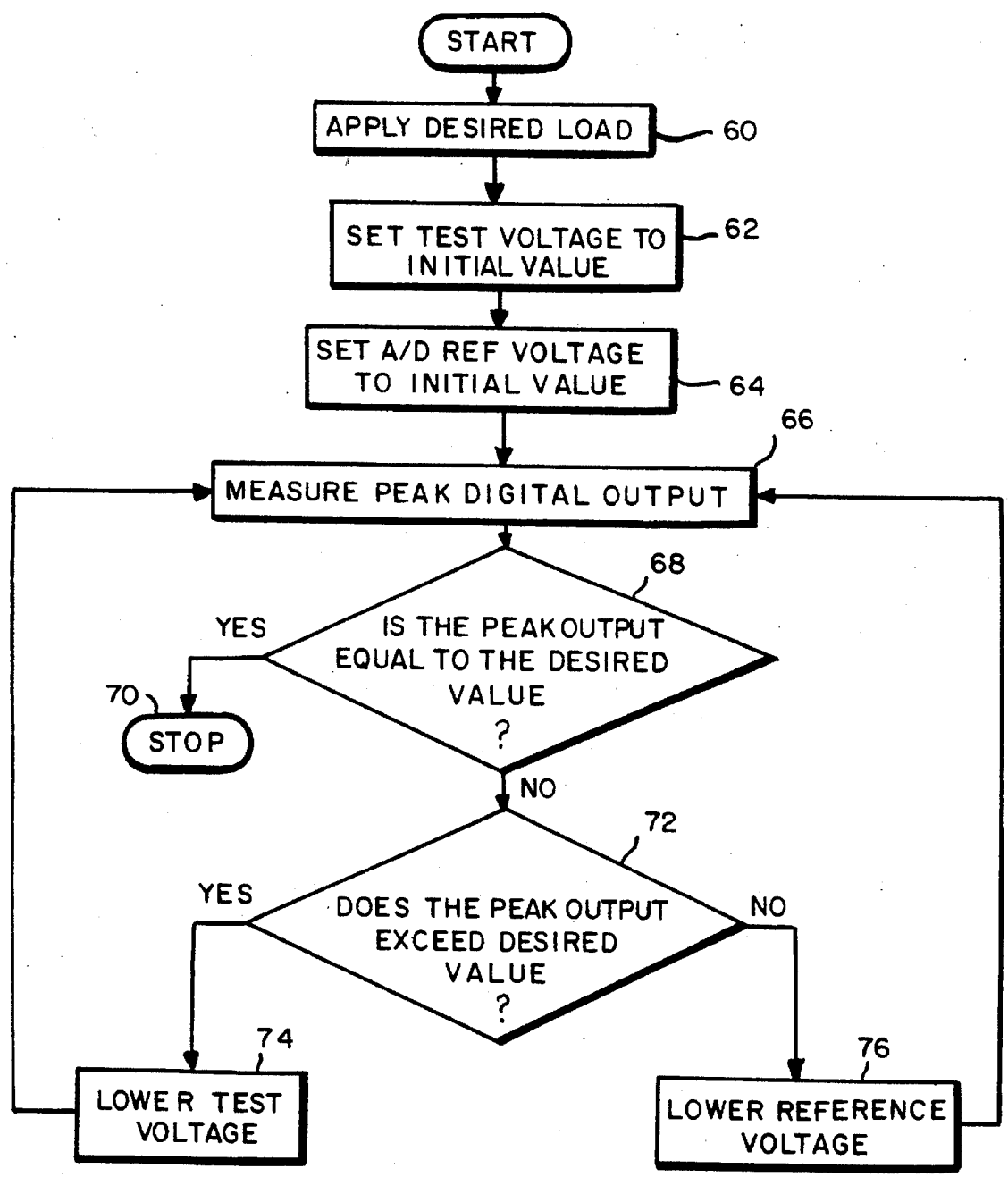
FIG. 4 is a block flow diagram of the circuit of FIG. 1 or FIG. 2 when performing calibration.

FIG. 4 is a flow diagram for the calibration process. Referring to this figure, the process is started with step 60 during which a known (desired) load is applied. While the load may be applied to a single test point, it is preferable that a typical load which is applied to the entire array. The typical load may be uniform, but generally varies across the array. Further, in applications where a different resolution is required for different areas of the array, a first load may be applied to a first area to calibrate that area and a second load used to calibrate another area(s) requiring a different resolution. During steps 62 and 64, circuit 34 puts out digital values on lines 35 to converters 32 and 30, respectively, to generate an initial test voltage on line 40 and an initial reference voltage on line 36. The initial values generated are the maximum values which these two voltages can assume.

Once these preliminary steps have been completed, the initial test voltage is applied to the array, or at least to the selected portion of the array being calibrated, and the peak digital output which appears on line 54 is measured (step 66). The signal on line 54 may be applied to an external circuit where calculations are performed and the information returned to control circuit 34 or the signals on line 54 may be applied directly to control circuit 34, which circuit has the processing capabilities and is programmed to perform the operations shown in FIG. 4. In either event, the measured peak digital output is compared against a desired value during step 68. Where the sensor array 10 is to be used in an uncertain environment, the desired value during step 68 may be one-half of anticipated peak signal. This should assure in an uncertain environment that unforeseen pressure spikes can be measured and that particularly high pressures at a given sensor point are not overlooked.

However, this mode of operation is disadvantageous in that it means that almost all, if not all, of the readings would be taken over only half the range of the system (i.e., system peak is calibrated to be at the midpoint of the sensor range). Therefore, all other outputs for lower pressures will be in the lower half of the voltage sensor ranges. This reduces sensitivity of the system. Therefore, where there is some certainty as to maximum applied pressures, for example with a dental occlusion sensor which would be dictated by the strength of the user's jaw, or a foot pressure sensor which would be dictated by a maximum anticipated weight of a user, the desired value could be anywhere up to one hundred percent of the sensor voltage range.

If during step 68 a "yes" output is obtained, this means that the test and reference voltages are the proper values and the process stops (step 70). If the peak output is not equal to the desired value, the operation proceeds to step 72 to determine if the peak output exceeds the desired value. A "yes" output during step 72, meaning that the peak output exceeds the desired value, causes the operation to proceed to step 74 to reduce the test voltage value stored in control circuit 34 which is applied in digital form to converter 32 to produce the test voltage on line 40. Reducing the test voltage has the effect of reducing the output voltage for a given pressure and therefore has the effect of bringing the peak output for the test load down closer to the desired value. Typically, the decrements during step 74 would be uniform, and the steps would be small enough so that there would not be an overshoot of the desired value. However, in some applications where rapid calibration may be desired, step 72 may not only determine if the peak output exceeds the desired value, but also by how much. The decrement could then be by a larger amount if the difference exceeds some threshold, and by smaller amounts if the difference is lower than the threshold to facilitate rapid closure.

Conversely, if a "no" output is obtained during step 72, indicating that the peak output is less than the desired value, the operation proceeds to step 76 to lower the reference value stored in control circuit 34. This results in a reduction in the reference value inputted through lines 35 to converter 36 in digital form and applied through line 36 to converter 38 in analog form. Since with a ratiometric circuit, the digital output on line 54 is equal to the ratio between the input and the reference, reducing the reference potential serves to increase the output signal for a given output voltage on line 42. Lowering the reference potential therefore has the effect of increasing the voltage output for a given pressure and sensor point resistance. Thus, by controlling the test and references voltages on lines 18 and 36, respectively, and by properly selecting the desired value on which comparisons are performed during step 68, the range and sensitivity of the circuit may be electronically controlled so as to limit the range over which readings are being taken to the range for which outputs will be generated by the circuit and to provide maximum sensitivity over such limited range.

Where the range or resolution is to be different for different areas of the array, the process of FIG. 4 would initially be performed with a typical pressure pattern being applied to one area of the array, the process calibrating the test and reference voltage for such area. The calibration process would then be repeated for another area of the array with the appropriate load being applied to such other area during calibration. This process could be repeated as many times as required for areas having different resolutions, with the appropriate test voltage and reference voltage being stored for each area; however, it would be unusual for there to be more than two different resolutions for a given array in a given application.

Finally, as was discussed earlier, in many applications pressure will only be applied to a very limited number of the sensor points and it is therefore desirable that processing only be performed with respect to such points. This capability is provided in the circuit of FIG. 1 by comparator 48 which generates an output on line 52 only if the output signal on line 42 from the sensor array exceeds a threshold voltage which is applied to line 50. Threshold voltage 50 can be selected to exclude all outputs except those for points of interest. Thus, with an occlusion sensor, the threshold would be the pressure normally applied between occluding teeth, so that outputs would occur only for raised points of contact which may be causing the patient discomfort. Similarly, for a foot pressure sensor, the threshold could be set for the normal distributed pressure for a person of the patient's weight over the sole of the shoe with outputs being obtained only at contact points where this pressure is exceeded, such points being places where the patient may be experiencing discomfort. In the absence of a signal on line 52 from comparator 48 indicating that the threshold has been exceeded, control circuit 34 does not enable converter 30 and is not itself enabled to process the output on line 42, these processing step, as will be discussed later being skipped. Alternatively, an output could appear on line 52 if the signal on line 42 is below the threshold, with the signal on line 52 being used to inhibit operation of the control circuit rather than enable it.

Figure 2:
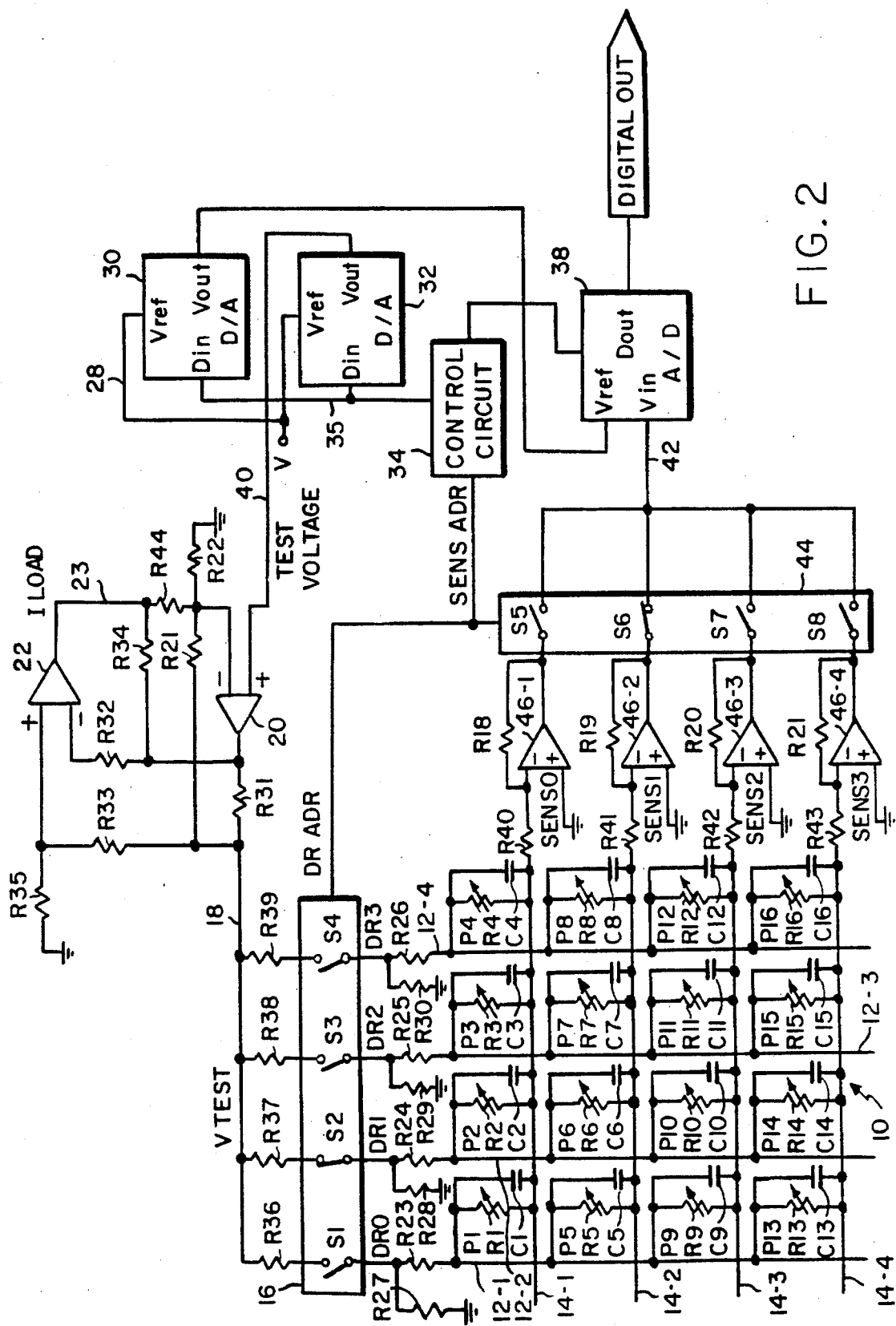
FIG. 2 is a schematic semiblock diagram of an alternative embodiment of the invention.

FIG. 2 shows an alternative embodiment of the invention which is the same as that of FIG. 1 except that it does not include comparator 48, so that all outputs on line 42 are processed, and it utilizes an analog rather than a digital technique to adjust the test voltage to compensate for variations in load current. In particular, rather than varying the test voltage on line 40 which is applied to the positive input of operational amplifier 20 in order to compensate for variations in load current, the load signal on line 23 from operational amplifier 22 is applied through resistor R44 and combined with the feedback signal from resistor R21 to be applied to the negative input of amplifier 20. The effect of using this analog technique is, however, the same as for the digital technique in that the test voltage is increased for increases in load current so as to maintain an output on line 42 which is independent of load. In particular, when the load signal on line 23 increases, there is a reduced voltage at the negative input to amplifier 20. Thus a lower voltage is subtracted in circuit 20, from the Vtest voltage on line 40, resulting in a higher Vtest output on line 18.

Figure 3:
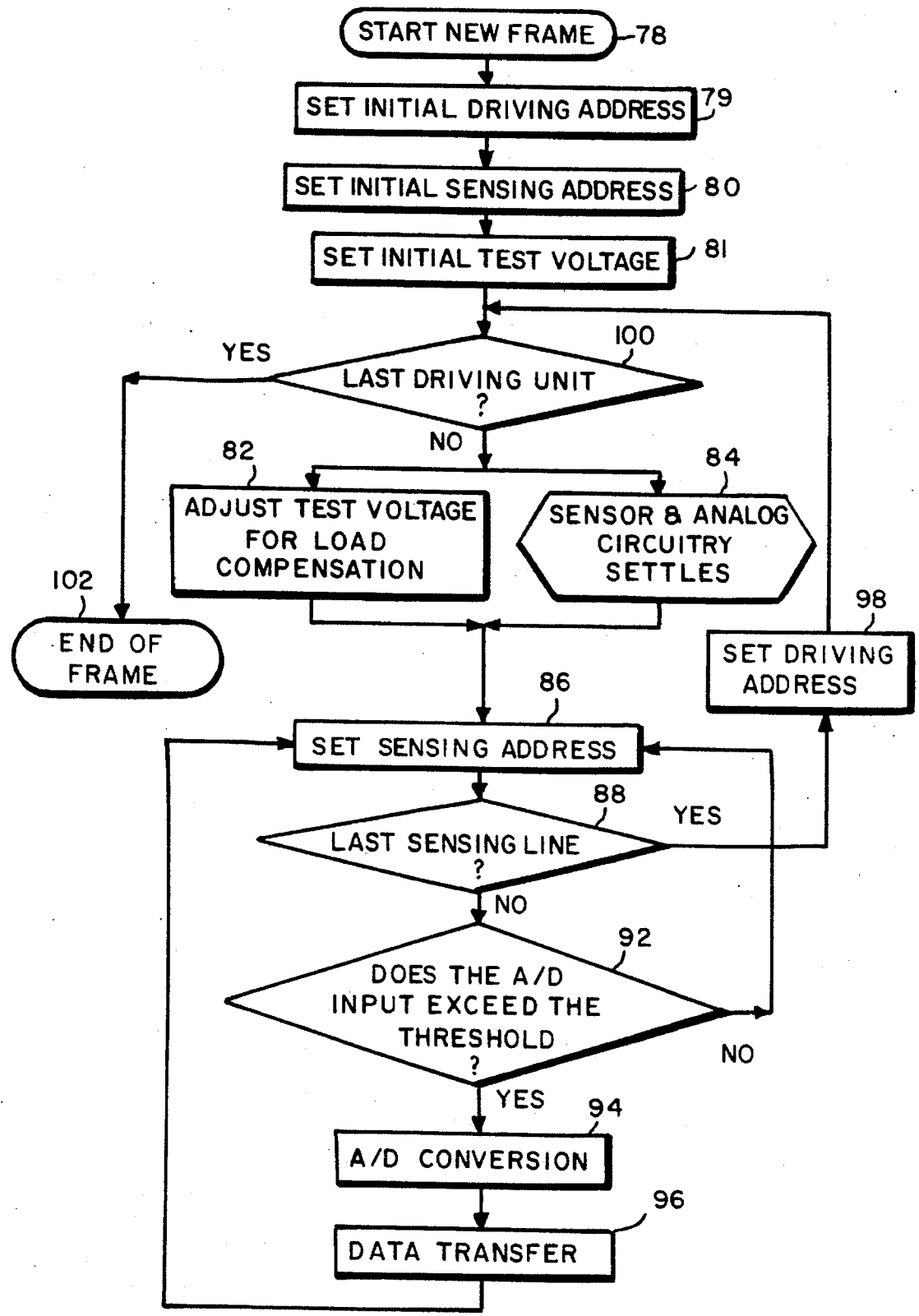
FIG. 3 is a block flow diagram of the operation of the circuit of FIG. 1 or FIG. 2 when performing scanning.

FIG. 3 is a general block flow diagram for the operation of The circuits of FIG. 1 or FIG. 2. The operation begins with step 78 for the beginning of a new frame and proceeds to step 79 during which an initial driving address is set. For example, the drive address for multiplexer 16 could be set to switch S1. During step 80, the next step in the operation, an initial sensing address is set for example, the sensing address for multiplexer 44 could be set to S5. From step 80 the operation proceeds to step 81 to set an initial test voltage. This is a test voltage which is set without regard for load compensation.

From step 81, the process proceeds to step 100 to determine if the drive line or electrode 12 which is selected is the last driving line. At the start of a new frame, a "no" output would be obtained during step 100. When a "no" output is obtained during step 100, the operation proceeds to steps 82 and 84. During step 82, the load compensation discussed in connection with FIGS. 1 and 2 as a result of the sensed load current across R31 is performed. At the same time, a predetermined period, for example 10 microseconds, is established to permit the sensor and analog circuitry to settle from the various switching operations.

When the last to be completed of steps 82 and 84 has been completed the operation proceeds to step 86 to set a sensing address. Since an initial sensing address was set during step 80, the same address may be reset during step 86. Alternatively, for example when only a selected area of the array rather than the entire array is to be scanned, as when there are areas of the array having different resolutions, a different address may be set as the sensing address during step 86.

During step 88 a determination is made as to whether all lines to be sensed for a given driving address have been sensed. Assuming a "no" output during step 88, the operation proceeds to step 92 to determine if the A/D input (the signal on line 42) exceeds the threshold voltage on line 50. If during step 92 it is determined that the input does not exceed the threshold, the operation returns to step 86 to increment multiplexer 44 or otherwise set a new sensing address. Assuming during step 88 that a determination is not made that all sense lines have been looked at, a new sensor point is sampled and a determination is again made during step 92 as to whether the output from this point exceeds the threshold. Assuming the output from this sensor point exceeds the threshold, the operation proceeds to step 94 to perform and A/D conversion on such output in converter 38 and to step 96 to transfer such value either to an external processor or to control circuit 34.

When step 96 is completed, the operation returns to step 86 to step/set to the next sensing address and steps 88, 92 and where appropriate, 94 and 96, are repeated for a successive sensor addresses until, during step 88, it is determined that all sensor lines have been looked at for the given driving address. When that occurs, a "yes" output is obtained which causes the operation to go to step 98. During step 98 a new driving address at multiplexer 16 is set. This may be accomplished by incrementing the multiplexer or by otherwise setting a new address therein. Step 100 is then performed to determine if the end of the frame has been reached (i.e., for example the incremented address is greater than the highest address in multiplexer 16). If a "no" output occurs during step 100, the test voltage is adjusted for the new drive line during step 82 and the sensing sequence of operations is repeated for this line. If a output occurs during step 100, the operation proceeds to step 102 to end the operation. From step 102 the operation may return to step 78 to initiate a new scan of array 10. Alternatively, where only a portion of the array having a particular resolution was scanned during the initial scan, the second scan may be performed on another area of the array having a different resolution. When this occurs, the initial driving and sensing addresses set during steps 79 and 80 and the initial test voltage set during step 81 may be different. If a "no" output is obtained during step 100, the operation proceeds to perform steps 82 and 84 and scanning on a new drive line is performed.

While two embodiments have been described above, it is apparent that other modifications in the circuits are possible. For example, compression could be performed by run length encoding or by other suitable compression technique(s), rather than or in addition to by thresholding. This could be performed for example by storing each sample and by comparing each incoming sample with the stored prior sample, an output being generated only if there is a difference. A counter would keep track of the number of outputs for which there is no difference and this information would be transmitted along with the new value. Other standard run-length encoding techniques could also be utilized.

Further, while for the disclosed embodiments some functions are shown as being performed digitally and other functions performed by analog techniques, it is apparent that the performance of these various functions in digital or analog is a matter of design choice in most instances and either technique may be employed. Further, while specific circuits have been shown for modifying the reference and test voltage in order to perform calibration and these voltages are both only lowered to perform calibration, it is apparent that, with suitable modifications, the calibration could be performed by starting at a low value for each of these voltages and increasing the values to achieve calibration, or by starting with either of these values at some midpoint and adjusting such value both up and down. Ratiometric circuits other than ratiometric A/D or D/A converters might also be used for these functions, or other selected techniques might be used to adjust Vtest and/or Vref to control range and sensitivity. Similarly, while specific techniques have been shown for detecting load current and for adjusting Vtest to compensate for load current, and these techniques are considered advantageous for these application, other techniques known to those skilled in the art could be used for performing this function.

Also, while the reference level for the circuit has been shown as ground, with for example a ground potential being applied to the plus inputs of amplifiers 46-1 to 46-4, the circuit could have another reference potential which would be applied throughout the circuit where ground potential is indicated. Other techniques might also be employed for establishing the desired potentials at the multiplexer side of output electrodes 14, though the technique shown is presently considered to be the preferred technique.

Thus, while the invention has been particularly shown and described above with reference to preferred embodiments, the foregoing and other changes in form and detail may be made therein by those skilled in the art without departing from the spirit and scope of the invention.

What is claimed is:

1. A circuit for scanning an array of pressure responsive sensor points, each of said points being intersected by one of a plurality of first electrodes and one of a plurality of second electrodes, there being a pressure sensitive resistance between the electrodes intersecting at each of said points, the circuit comprising:

means for generating a test signal;

a first multiplexer for selectively applying the test signal to each first electrode, the test signal flowing through the pressure sensitive resistance for sensor points intersected by said first electrode for which the resistance is in a lowered resistance state to the second electrode intersecting the point;

an output circuit; and a second multiplexer for selectively passing test signals appearing on the second electrodes to the output circuit;

said output circuit including a means for controlling the sensitivity of the circuit.

2. A circuit as claimed in claim 1 wherein said test signal is an analog voltage, wherein said means for controlling is a ratiometric A/D converter one input to which are outputs from said second multiplexer and the other input to which is a reference voltage, and including means for selecting a sensitivity for the circuit, and means responsive at least in part to the selected sensitivity for controlling the value of said reference voltage.

3. A circuit as claimed in claim 2 wherein said means for controlling the reference voltage is operative to reduce the reference voltage to achieve increased sensitivity.

4. A circuit as claimed in claim 1 wherein there is a desired range of pressures to be sensed, and wherein said means for generating a test signal generates a test voltage, the value of which is a function of the range.

5. A circuit as claimed in claim 4 wherein the value of the test voltage is decreased to increase the pressure range at the high end and is increased to improve sensitivity for low pressures.

6. A circuit as claimed in claim 1 including means for sensing the load to which said test signal is being applied, and means responsive to the sensed load for controlling the value of the test signal.

7. A circuit as claimed in claim 6 wherein said test signal is a test voltage, wherein said means for sensing senses the current for said test voltage, and wherein the means for controlling the value of the test signal includes means responsive to the sensed current for modifying the value of the test voltage.

8. A circuit as claimed in claim 7 wherein said means for sensing includes a known resistance through which said test voltage passes and a differential circuit for detecting the voltage drop across said resistance, the output from said differential circuit being a function of the sensed current.

9. A circuit as claimed in claim 7 wherein said means for modifying includes an A/D converter for converting the sensed voltage to a digital value, a digital processor for generating a test voltage modifying value in response to the sensed voltage, a D/A converter for generating a test voltage modifying voltage, and means for applying the modifying voltage to modify the test voltage.

10. A circuit as claimed in claim 7 wherein said means for modifying includes means for converting the sensed voltage into a test voltage modifying voltage, and means for applying the modifying voltage to the means for generating the test voltage to modify the value of the test voltage.

11. A circuit as claimed in claim 1 including means for applying a ground potential to each second electrode at an end of said electrode adjacent said second multiplexer.

12. A circuit as claimed in claim 11 wherein said means for applying a ground potential is an operational amplifier with a positive input at ground, a negative input receiving the output from the second electrode, and a feedback through a feedback resistance from the operational amplifier output to its negative input.

13. A circuit as claimed in claim 1 wherein there are trace capacitances for said sensor points; and including means for reducing the discharge time for said trace capacitances at the end of each test signal.

14. A circuit as claimed in claim 13 wherein said means for reducing discharge time includes a resistance path to ground for each of said first electrodes.

15. A circuit as claimed in claim 1 including a detector at the output from said second multiplexer for determining if each output from the multiplexer exceeds a selected threshold value and for passing only outputs which exceed the threshold value to the output circuit.

16. A circuit as claimed in claim 1 wherein different areas of said array have different sensitivities, and wherein said means for controlling is operative to provide the proper sensitivity for each of said areas.

17. A circuit for scanning an array of pressure responsive sensor points, each of said points being intersected by one of a plurality of first electrodes and one of a plurality of second electrodes, there being a pressure sensitive resistance between the electrodes intersecting at each of said points, the circuit comprising:

means for generating a test voltage;

a first multiplexer for selectively applying the test voltage to each first electrode, the test voltage flowing through the pressure sensitive resistance for sensor points intersected by said first electrode for which the resistance is in a lowered resistance state to the second electrode intersecting the point;

an output circuit and means for sensing the load to which said test voltage is being applied, said means including means for sensing the current for said test voltage;

means responsive to the sensed current for controlling the value of the test voltage, said means including an A/D converter for converting the sensed current to a digital value, a digital processor for generating a new digital test voltage value in response to the sensed current, a D/A converter for generating a new test voltage value in response to the digital test voltage value, and means for utilizing the new test voltage value to produce the test voltage; and a second multiplexer for selectively passing test voltages appearing on the second electrodes to the output circuit.

* * * * *